US 7,917,634 B2

(12) United States Patent
Silky et al.

(10) Patent No.: US 7,917,634 B2
(45) Date of Patent: Mar. 29, 2011

(54) METHOD AND SYSTEM FOR MAINTAINING A CONFIGURATION STATE

(75) Inventors: Allen E. Silky, Dublin, CA (US); Jack H. Chou, San Jose, CA (US); Hui-Chen Lee, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 115 days.

(21) Appl. No.: 12/241,934

(22) Filed: Sep. 30, 2008

(65) Prior Publication Data

US 2009/0031031 A1   Jan. 29, 2009

Related U.S. Application Data

(60) Continuation of application No. 11/355,471, filed on Feb. 15, 2006, now Pat. No. 7,447,802, which is a division of application No. 09/823,818, filed on Mar. 30, 2001, now abandoned.

(51) Int. Cl.
*G06F 15/16* (2006.01)
(52) U.S. Cl. ...................................................... 709/227
(58) Field of Classification Search ........................ None
See application file for complete search history.

(56) References Cited

U.S. PATENT DOCUMENTS

| | | | |
|---|---|---|---|
| 5,774,670 A | 6/1998 | Montulli | |
| 5,835,712 A * | 11/1998 | DuFresne | 709/203 |
| 5,961,601 A | 10/1999 | Iyengar | |
| 6,064,982 A | 5/2000 | Puri | |
| 6,128,644 A * | 10/2000 | Nozaki | 709/203 |
| 6,336,135 B1 * | 1/2002 | Niblett et al. | 709/215 |
| 6,353,839 B1 | 3/2002 | King et al. | |
| 6,401,125 B1 | 6/2002 | Makarious et al. | |
| 6,424,981 B1 | 7/2002 | Isaac et al. | |
| 6,496,824 B1 | 12/2002 | Wilf | |
| 6,684,369 B1 | 1/2004 | Bernardo et al. | |
| 6,687,816 B1 | 2/2004 | Frayman et al. | |
| 6,714,219 B2 | 3/2004 | Lindhorst et al. | |
| 6,836,801 B1 * | 12/2004 | Parrish et al. | 709/224 |
| 6,938,257 B1 * | 8/2005 | Rapp et al. | 719/311 |
| 7,089,563 B2 | 8/2006 | Nagel et al. | |
| 7,302,402 B2 | 11/2007 | Callaghan et al. | |
| 7,447,802 B2 | 11/2008 | Silky et al. | |

OTHER PUBLICATIONS

Duen-Ren, L. et al., "Applying Agents to Search goods Information Based on Three-Level Metadata Architectures," *IEEE Workshop on Database and Expert Systems Applications*, Sep. 1999, pp. 630-634.
Hadjiefthymiades, S. et al., "State Management in WWW Database Applications," *IEEE COMPSAC '98*, Aug. 1998, pp. 442-448.

* cited by examiner

*Primary Examiner* — Ario Etienne
*Assistant Examiner* — Clayton R Williams
(74) *Attorney, Agent, or Firm* — Kilpatrick Townsend & Stockton LLP

(57) ABSTRACT

A system for configuring configurable products includes a stateless configuration engine. A user and a server are coupled to a network for transmitting and receiving information. The user includes a web browser, memory and a display. The user receives web pages from the server and enters information into the fields on the page. The user sends the web page and the entered information to the server. The server decodes the information on the web page and sends a next page to the user including hidden form fields that include the decoded information. The information is stored in the source code of the page displayed by the web browser located at the user.

18 Claims, 9 Drawing Sheets

Custom Solutions for your Business

Step > ① ② ③ ④

Please verify that this information is correct

---

What is your business need?
Buy or lease equipment    *Buy or lease equipment* ( change )

Which industry is your business in?
Restaurant    ( change ) ─ 704

What is your annual revenue?
$1,500,000    ( change )

↗ 702

How much money are you looking for?
$50,000    ( change )

What is your primary collateral?
Office based equipment    ( change )

Do you want to lease or own your equipment?
Not sure    ( change )

Are you concerned about your equipment becoming obsolete?
Yes    ( change )

( <back ) ( finish )

FIG. 7

METHOD AND SYSTEM FOR MAINTAINING A CONFIGURATION STATE

CLAIM OF PRIORITY

This application is a continuation of U.S. patent application Ser. No. 11/355,471, entitled Method and System for Maintaining a Configuration State," filed Feb. 15, 2006, which is a divisional case of U.S. patent application Ser. No. 09/823,818, entitled "Method and System for Maintaining a Configuration State," filed Mar. 30, 2001, each of which is hereby incorporated herein by reference.

BACKGROUND OF THE INVENTION

Technical Field

The present invention relates generally to interactive configuration systems, and more particularly, to systems and methods for tracking user configuration session state in a web browser allowing the configuration server to remain stateless.

Several products offered for sale nowadays are composed of multiple selectable components that can be put together in various different configurations. When a consumer desires to purchase such a configurable product, she needs to communicate to the supplier of the product, which specific product configuration she wants. For instance, a computer system is an example of a configurable product, which comprises various selectable components, such as monitors, processors, memories, sound cards, printers, etc. A user can thus create a particular customized computer system by selecting a certain monitor, a certain processor, a certain memory, a certain sound card, a certain printer, and so on.

One method for configuring the product is to use an interactive website. The website provides the user with prompts to enter product configuration information. Generally, in interactive websites, the server hosting the website must maintain a per-user state for each user that accesses the website. In order to have access to information entered by the user in the previous pages, the state information for the user must be maintained. The state maintains information entered by the user and this information is used to dynamically present webpages to users based on their session history. The state information may include, for example, selections from an a-store or options on a configurable product.

Storing state information on the server presents several problems. For instance, the server must allocate memory to store the state information for every user accessing the website. These users may or may not be actively using the website. For example, a user may select an item to purchase, but may not yet have completed the transaction. This idle user could occupy valuable memory resources on the server while the server stores the identity of the user and the selected product for an indefinite period of time. With large numbers of users, the amount of resources needed to store the state information for all idle users can become prohibitively expensive. One solution for minimizing resources for idle users is to store the state information for a limited period of time. In this case, a user that remains idle for a predetermined period of time will be timed out and will have to recreate any previously entered configurations.

It may also be difficult to predict just how much memory to allocate to support a given website. For instance, it is relatively simple to predict how many users will actively access a server in a given period of time. It is not so simple, however, to predict how many idle users will be taking up space on the server with state information. The server must also have a back-up system for saving state information for all users in the event of a server failure. This process may also take up significant amounts of memory and adversely affect performance.

One current method for storing state information is to use cookies. The cookie is a small text file stored at the user 102 by the web browser 104. The cookie may contain small amounts of information, such as a name and address. It may also contain an identification field that maps to information stored on the server. Cookies do not, however, contain extensive amounts of state information, such as the user's state during a configuration session. Furthermore, many end users and businesses have disabled the use of cookies for security reasons, thus making it impossible to access web pages that require the use of cookies.

When using configuration software to configure a product, the configuration engine generally maintains the state of computation between user requests. The engine operates on the delta changes since the last engine request. Delta changes may be monotonic or non-monotonic. Monotonic changes could be additional selections on the controls that did not have previous selections. Monotonic changes trigger continuation of computation from the previous state. Non-monotonic changes may involve reselection on a control or de-selection of previously chosen item. Non-monotonic changes require the engine to unwind the computation associated with retracted selection. This may involve elaborate computations associated with generating user-guiding behavior that flags selections inconsistent with the existing selections. This requires maintenance of elaborate dependency structures that facilitate unwinding of the computation. Unwinding of the computation must be performed with considerable care to insure that the result of unwinding is the same as if retracted selection never took place. In addition, the configuration engine must always maintain dependency information to provide explanation capabilities for conflicts, selection and elimination of selections. In order for the configuration engine to maintaining the state of the configuration session, considerable amounts of processing time and memory resources are required.

Thus, there is a need for a system that minimizes the resources required by a server hosting an interactive website and allows for easy prediction of the required memory allocation for a server that supports an interactive website. There is also a need for a system that allows for storage of session information at the user without creating a security risk through the use of that information.

BRIEF SUMMARY OF THE INVENTION

Various embodiments of the present disclosure minimize the required resources and allow for predictability in memory allocation by providing systems and methods for configuring configurable products that include a stateless configuration engine. When a user accesses an interactive website, the information provided by the user is stored in the user's memory. The server does not need to maintain a copy of this information in order to allow the user to traverse the website while using the stored information. For instance, if the user wanted to configure a computer using configuration software on an interactive website, the user would enter information onto the displayed web page and send this page with the entered information to the server. The server may then translate the information and store this translated information-in hidden form fields. The hidden form fields are stored within the code of the subsequent web pages. As the user accesses new pages on the website, the state information containing all of the user entered information to date will be hidden in the source code of the new pages. As a result, the server does not need resources to support the state information of idle users. A user may remain idle for any length of time and when the user re-initiates a session with the server, all of the user's state information is sent along with the current page to the server.

BRIEF DESCRIPTION OF THE DRAWINGS

FIG. 7 is one embodiment of a user interface for the third web page in a configuration process.

DETAILED DESCRIPTION OF THE INVENTION

Figure 1:
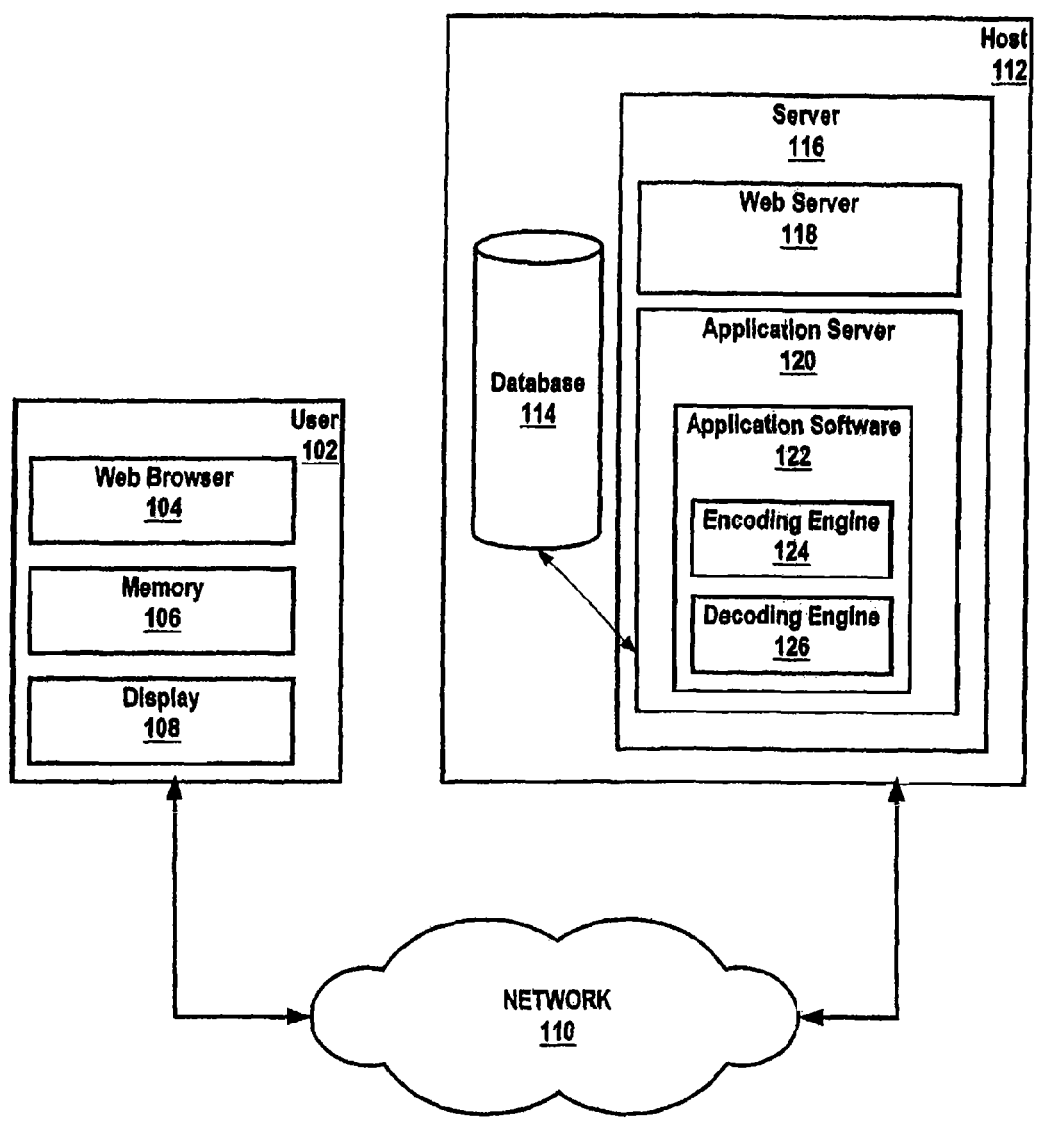
FIG. 1 is a diagram of a preferred embodiment of a system including the present invention.

FIG. 1 is a diagram of a preferred embodiment of a system including the present invention. The system includes a user 102, a network 110, and a host 112. The user 102 includes a web browser 104, a memory 106, and a display 108. The host 112 includes a database 114 and a server 116. The server 116 includes a web server 118 and an application server 120. The application server includes application software 122, which includes an encoding engine 124 and a decoding engine 126. The user 102 and the host 112 are connected via the network 110.

In a preferred embodiment, the network 110 may be the Internet, a proprietary network or an intranet, however other networks may also be used. Alternately, in some embodiments, the host 112 and users 102 may communicate indirectly or directly without passing through the network 110. FIG. 1 shows only one example of a possible architecture and the invention is not limited to the architecture illustrated in FIG. 1.

The user 102 may be a personal computer with an internet connection. Alternatively, the user 102 may be a stand alone terminal designed to receive inputs used to configure any number of products. For example, a retail store may provide kiosks for its customers to browse the configurable products offered for sale by the store. The kiosk may have a touch screen user interface or may be a conventional PC with a keyboard, mouse and display screen.

The user 102 preferably accesses the server 116 via a web browser 104 connected to a network 110 such as the Internet, although other networks including proprietary networks and intranets may also be used. In a preferred embodiment, the users' browsers 104 may operate in conjunction with one or more computer systems such as desktop computer, laptop computers, network computers, handheld storage devices, PDAs, cellular telephones, etc. A preferred embodiment of the present invention is implemented in a client server environment as described herein. The Internet is one example of such a client server environment, however, any other appropriate type of client server environment, such as an intranet, a wireless network, a telephone network, etc., may also be used. The present invention is not limited to the client server model and could be implemented using any other appropriate model, for instance, an application hosting model. The described embodiment uses the worldwide web, although other protocols may also be used and other newer versions of the web may be used as well. A redirector may also be employed between the browsers and the server 116.

In a preferred embodiment, the user 102 also includes a memory 106 and a display 108. The memory 106 may be random access memory used to store the source code of the web page currently displayed. The display 108 may be any commonly used display such as a computer monitor, a television screen or a touch screen.

In a preferred embodiment, the host 112 maybe a corporation or other entity that provides configurable products to its customers. The host 112 may have the processing capability to support communication with the user 102, to generate and send web pages to the user 102, and to receive and store information from the user 102. The database 114 is used by the host 112 to store information received from the user 102 in certain circumstances. For instance, if the user 102 has configured a product and proceeds to make a purchase request for that configured product, then the host may store the information for that configured product in the database 114.

In a preferred embodiment, the server 116 generates and sends web pages via the network 110 to the user 102. In this embodiment, the web server 118 generates and sends pages that do not require user inputs, as pages that require user inputs are sent by the "application server 120. For instance, the web server may send a home page or several introductory pages. The application server 120 sends pages that have been generated by the application software 122, and such pages generally require user input. The application software 122 includes an encoding engine 124 and a decoding engine 126. The encoding engine 124 and decoding engine 126 may be portions of the same software code. This software code is stored in a memory and executed by a computer processor, although the invention is not limited to this embodiment. These instructions may be stored on a computer-readable medium, such as a floppy disk, CD ROM, or any other appropriate storage medium. The encoding engine 124 generates and sends web pages including hidden form fields. The hidden form fields consist of preformatted information contained in the source code of the web page, but which is not visible to the user. This information may be generated by the application software 122 or by inputs from the user 102. The decoding engine 126 receives and processes information from the user 102. The functions of the encoding and decoding engines 124, 126 are discussed in greater detail below in the description of FIGS. 2-4.

Figure 2:
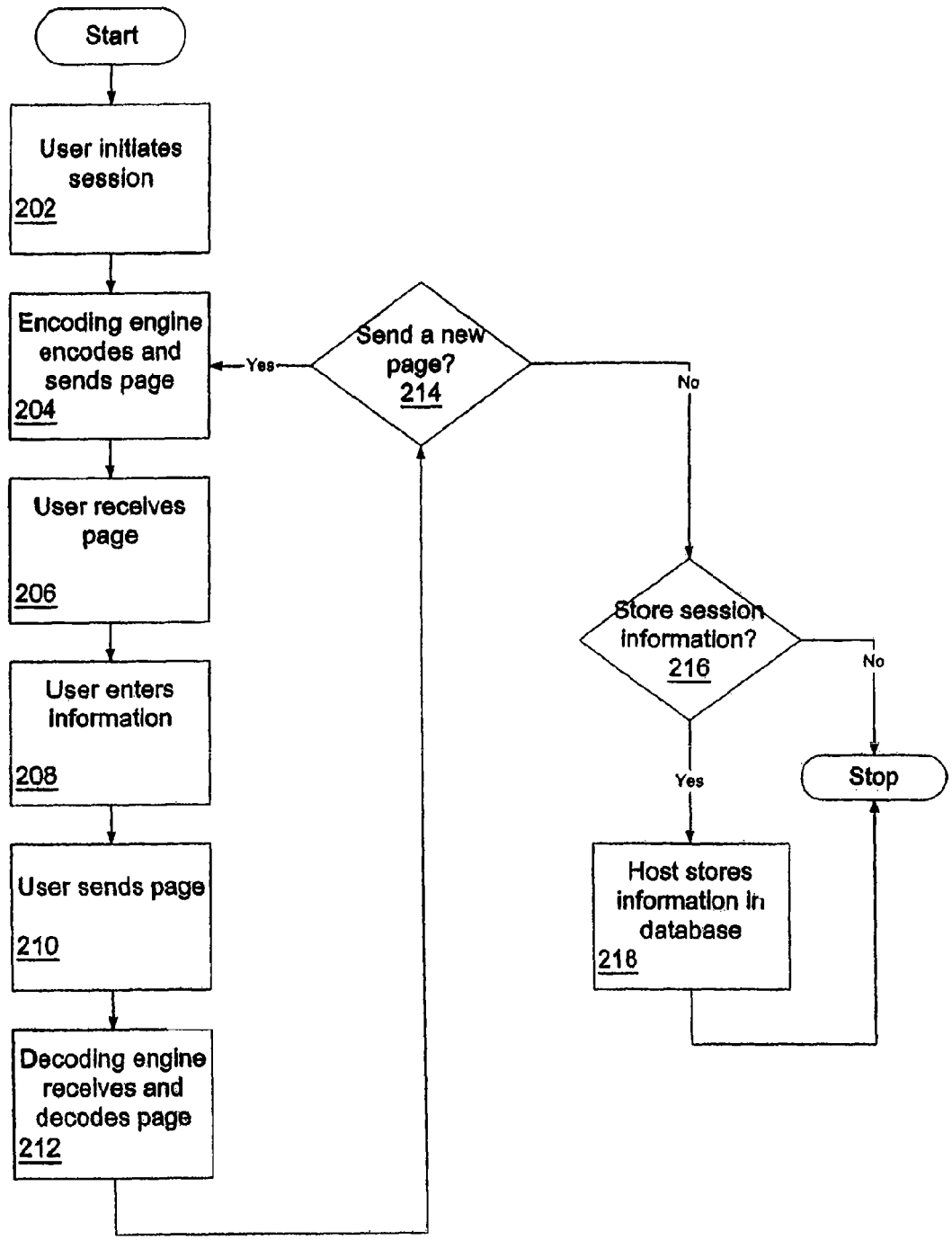
FIG. 2 is a flow chart of a preferred embodiment of the process for maintaining session information according to the present invention.

FIG. 2 is a flow chart of one embodiment of the process for maintaining session information. In step 202, the user initiates the configuration session. Prior to the user's calling of the application software 122, the web browser 104 may have sent several pages to the user 102. The user 102 may also be navigating the website without entering information that must be stored in the hidden form fields. It is also possible that the user's 102 choices in navigating the website alone are stored as state information in hidden form fields and that this information will affect the subsequent pages sent to the user 102. The configuration session begins once the user 102 calls a page that contains prompts for data entry.

The encoding engine 124 encodes 204 and sends the first page of the configuration session. The first page of the session may contain default information in the hidden form fields. Alternatively, the form fields may be blank until the user 102 enters the first set of session information. The encoding process 204 is discussed in greater detail in the description of FIG. 3 below.

In a preferred embodiment, the user 102 receives 206 the page including the hidden form fields from the application server 120 via the network 110. The user 102 then enters 208 information with the aid of a user interface (UI), examples of which are described in FIGS. 5 and 6. The user 102 then sends 210 the page with the entered information via the network 110 to the application server 120.

The decoding engine 126 receives and decodes 212 the page to obtain the information entered by the user 102 that is stored as values in the hidden form fields. The decoding process 212 is discussed in greater detail in the description of FIG. 4 below.

Based on the information obtained during the session, the application software 122 determines, in step 214, whether to send a new page to the user 102. If the application software 122 decides to send a new page, then the encoding engine encodes 204 and sends this new page with current state information for the user stored in hidden form fields. Steps 204 through 214 are thus repeated until the application software 122 decides not to send a new page. If the application software 122 decides not to send a new page, then the application software 122 determines 216 whether to store the session information for the current session. If the user 102 has configured a product during the session and requests to purchase this product or requests additional information regarding this product, then the host may wish to save the configuration and other session information. The additional information may include, for example, information identifying the user 102, contact information, billing information, etc. If the application software 122 decides to store the information, then the information is sent from the decoding engine 126 to the database 114 of the host 112. After the information is stored in the database 114 or if the application software 122 decides not to store the information, the session is complete. If the information has not been stored in the database 114, then it will be lost when the user 102 closes the web browser 104. In an alternate embodiment, the user 102 may save the contents of the web browser 104 in memory 106, thus enabling the user 102 to restore the session information at a later time. In one embodiment, once the information has been stored in the database 114, the application software 122 resets the session information and the application server 120 sends to the user 102 a web page that does not contain any configuration information.

Figure 3:
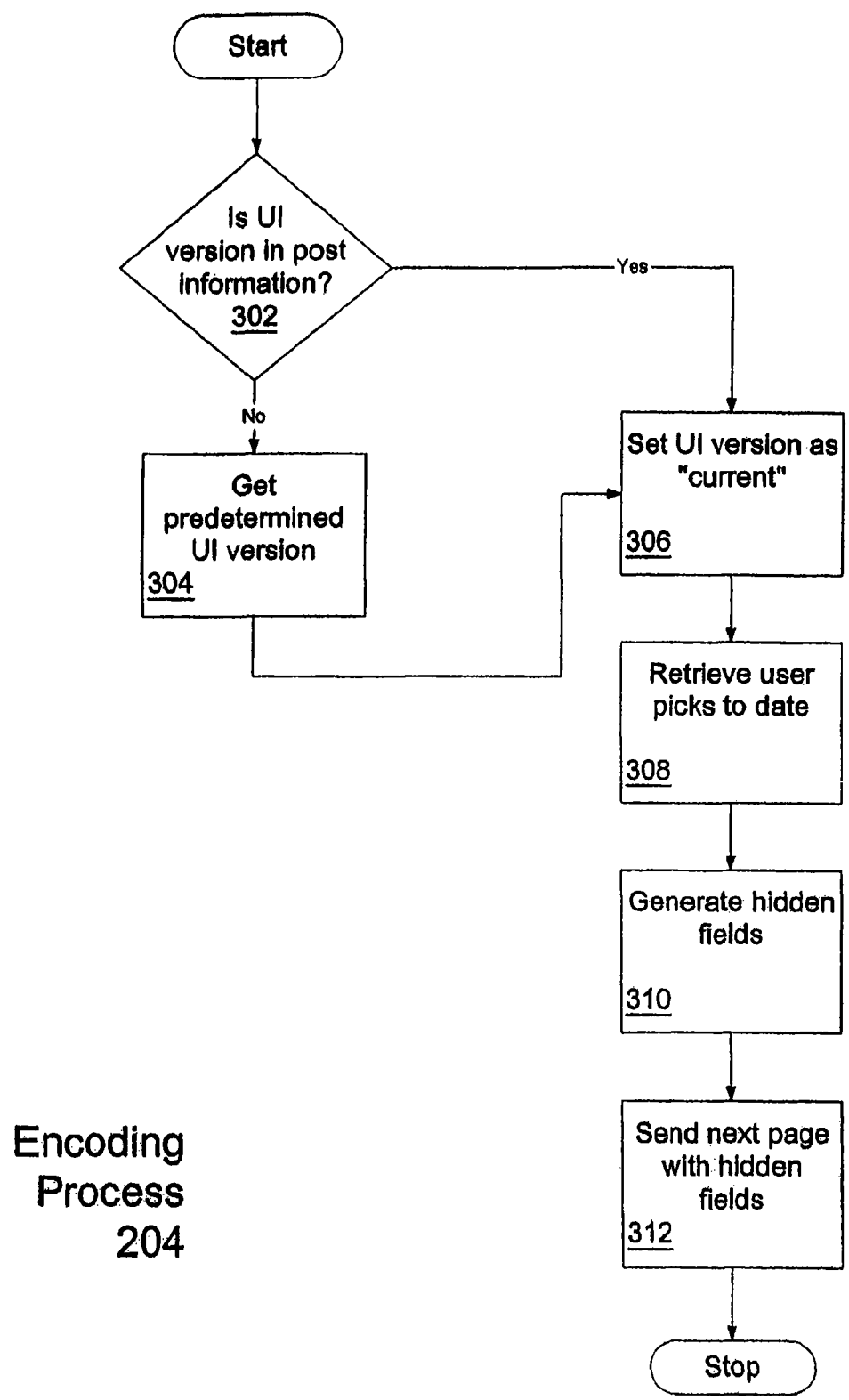
FIG. 3 is a flow diagram of a preferred embodiment of the encoding process.

FIG. 3 is a flow chart of one embodiment of the encoding process 204. In step 302, the encoding engine 124 determines whether a user interface (UI) version for the web page is stored in the post information. The UI version determines how the pages will be displayed by the web browser 104. The post information contains the session information in its entirety, including current user selections and hidden fields. The post information may also contain information generated by the application software 122 that is not part of the current session information. Since the server 116 is not maintaining session information, the storage of the UI version in the hidden form fields is important for maintaining a uniform presentation to the user 102 throughout the session. If there is no UI version stored in the post information, then the encoding engine 124 retrieves 304 a default UI version. If the default UI version is retrieved, then this UI version is set 306 to the "current" UI version. If a UI version is stored in the post information, then this UI version is set 306 to the "current" UI version. The current UI version is maintained throughout the session. In this manner the user 102 may complete a session using the same model while new users may start sessions with a different model.

In a preferred embodiment, the encoding engine 124 then retrieves 308 the user picks to date, which are accessible to the encoding engine 124 after the decoding engine 126 decodes the user picks from the last web page sent by the web browser 104 of the user 102. The user picks may include any information that the user 102 has entered in a sent web page. The user picks are maintained from page to page such that the third page will still include user picks entered by the user 102 in the first page. The encoding engine 124 generates 310 hidden form fields based on the user picks. The encoding engine 124 then sends 312 the next page to the user 102 including the hidden form fields. Once the page has been sent to the user 102, the host 112 no longer has a record of the session information. All of the user picks are stored in the page that is displayed by the web browser 104.

Figure 4:
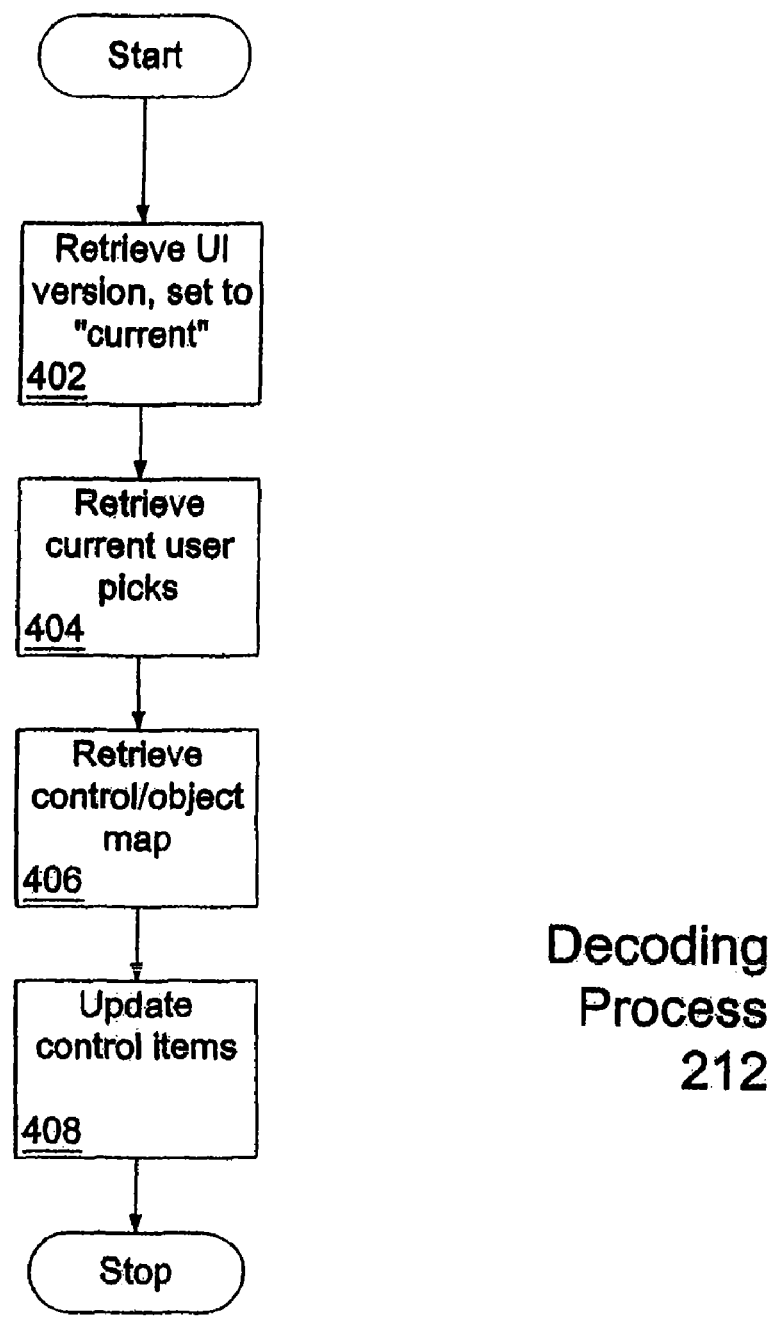
FIG. 4 is a flow diagram of a preferred embodiment of the decoding process.

FIG. 4 is a flow diagram of one embodiment of the decoding process 212. The decoding engine 126 retrieves 402 the UI version and sets this version to the "current" UI version. The decoding engine 126 then retrieves 404 the current user picks. The decoding engine 126 then retrieves 406 the control/object map. The control/object map pairs the controls contained in the web pages to objects in the application software 122. The controls may be any type of commonly used controls on web pages including, but not limited to pushbuttons, scroll bars, pull-down menus, etc. When a user manipulates a control to choose a selection, for instance, this selection is included in the session information for that user and mapped to an object in the application software 122. The object will store the data generated by that selection and define what procedures the application software 122 should take based on that data. The decoding engine 126 then updates 408 the control items using the current state as entered by the user.

Figure 9:
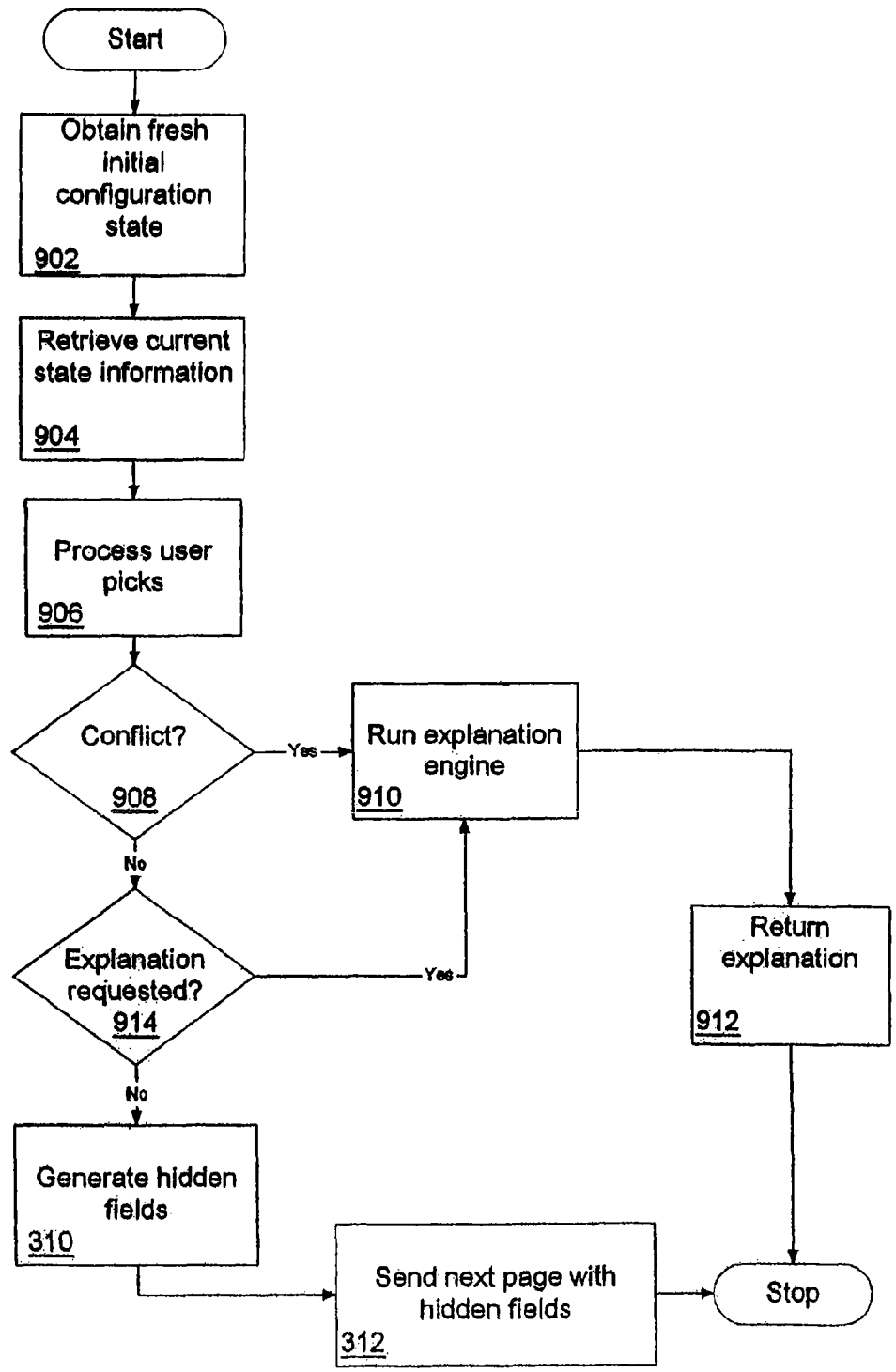
FIG. 9 is a flow diagram of one embodiment of a stateless configuration process.

FIG. 9 is a flow diagram of one embodiment of a stateless configuration process. Before initiating a configuration session or after sending a page to a user 102, the application software 122 obtains 902 a fresh configuration state. Since the current state information is stored at the user 102, the configuration engine does not maintain configuration selections previously made by the user 102 and thus, the application server requires less processing power and memory. In step 904, the configuration engine receives the current state information from the user 102. This state information includes all of the user selections made previously as well as any state information generated by the application software 122.

In step 906, the configuration engine processes the user picks. Because the configuration engine receives the entire current state as opposed to only the most recent user selections, the required processing is reduced. For instance, if the user changes a previously made selection, only the new selection is sent to the application server and the previously made selection no longer exists. The stateless configuration engine does not need to make the potentially extensive unwinding computations to undo the previously made selection, which may also require the maintenance of elaborate dependency structures. This results in faster processing speed and lower memory requirements. Furthermore, because there is no unwinding computation when the user changes a selection, there is less risk of error.

The configuration engine then determines 908 whether there is a conflict in the configuration. If there is a conflict, then the configuration engine runs 910 the explanation engine and returns 912 an explanation of the conflict to the user 102.

The user 102 may also explicitly request an explanation. If the user 102 requests 914 an explanation, then the configuration engine again runs 910 the explanation engine and returns 912 an explanation of the conflict to the user 102. The configuration engine does not have to maintain active structures for the explanations since the explanations are only generated when necessary. Alternatively, the configuration engine may always maintain active explanation structures such that the explanation engine runs with each user interaction. If there is no conflict and no explanation is requested, then the application software 122 generates 310 hidden fields and sends 312 the next page to the user 102 as described above in the description of FIG. 3.

Generally, when a new configuration session begins, the configuration engine must initialize the engine state by allocating memory, loading initial data, initializing variables, etc. Because fewer resources are needed to run the stateless configuration engine than to run a configuration engine that maintains state information, the configuration engine can maintain a pool of pre-initialized engine states. Thus, when a user begins a new configuration session, one of these pre-initialized engine states is retrieved and the delay for the initialization process is greatly reduced.

Figure 5:
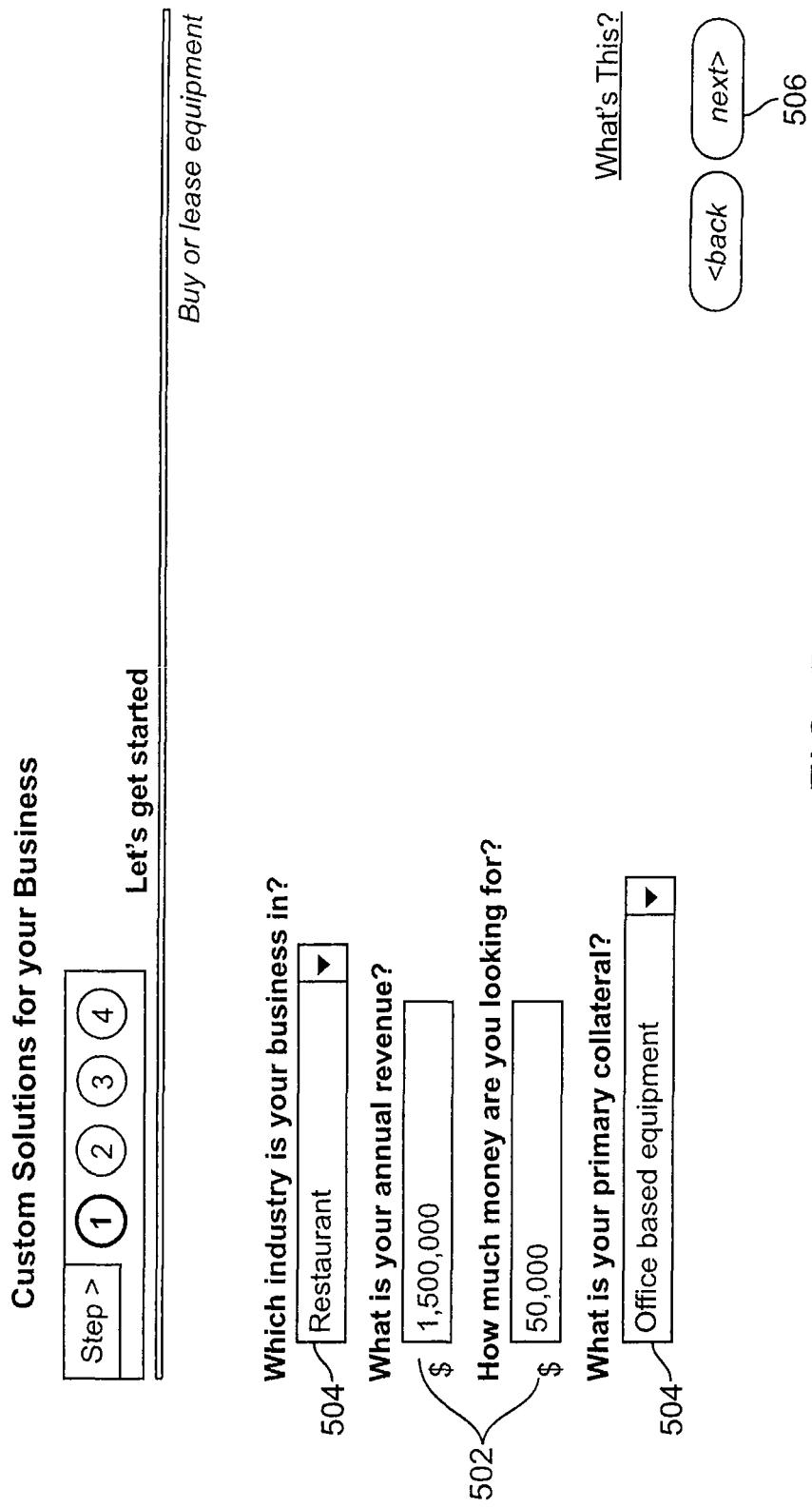
FIG. 5 is a user interface of the first web page in a configuration process allowing the user to enter session information.

FIGS. 5-8 are preferred embodiments of a user interface for a website containing configuration software. FIG. 5 is a user interface of the first web page in a configuration process allowing the user 102 to enter session information. The user interface contains blanks 502 for the user 102 to enter information and drop down menus 504 for the user 102 to choose from a list of options. Once the user 102 presses the "next" button 506 with a click of a mouse or a touch on a touch screen, the information entered into the fields will be sent to the application server 120. The application server 120 will then decode the information, process the information and encode the information in hidden form fields in the next page sent to the user 102. Essentially, the application server 120 encodes in the next page all information necessary for the application server 120 to identify the current state of the user's session. Once the application server 120 sends the next page to the user 102, the server 116 is no longer storing any session information. The server 116 will not need to allocate any resources to the user 102 until the user 102 enters the next page for processing.

Figure 6:
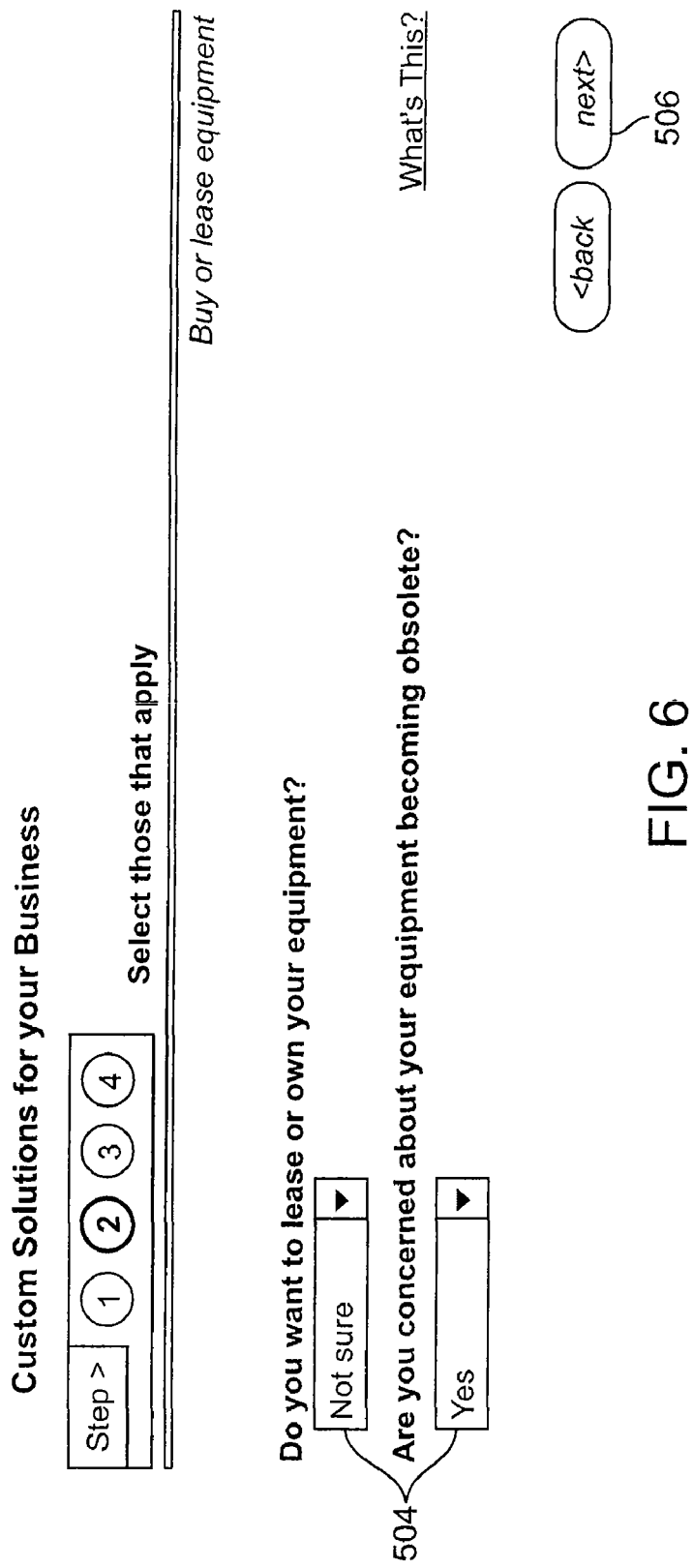
FIG. 6 is one embodiment of a user interface for the second web page in the configuration process.

FIG. 6 is one embodiment of a user interface for the second web page in the configuration process. The user 102 is again given drop down menus, each containing a list of options for the user 102. The information entered in the first web page is not visible, however, this information is stored in hidden form fields in the source code of the second web page. Like the first web page, the second web page is sent to the application server 120 for processing when the user 102 presses the "next" button 506.

FIG. 7 is one embodiment of a user interface for the third web page in a configuration process. The information entered by the user 102 to date is displayed 702 for the user 102 to review. The user 102 may press a "change" button 704 to edit the information previously entered. If the user 102 enters new information, then the information is decoded, processed and used to update the hidden form fields.

Figure 8:
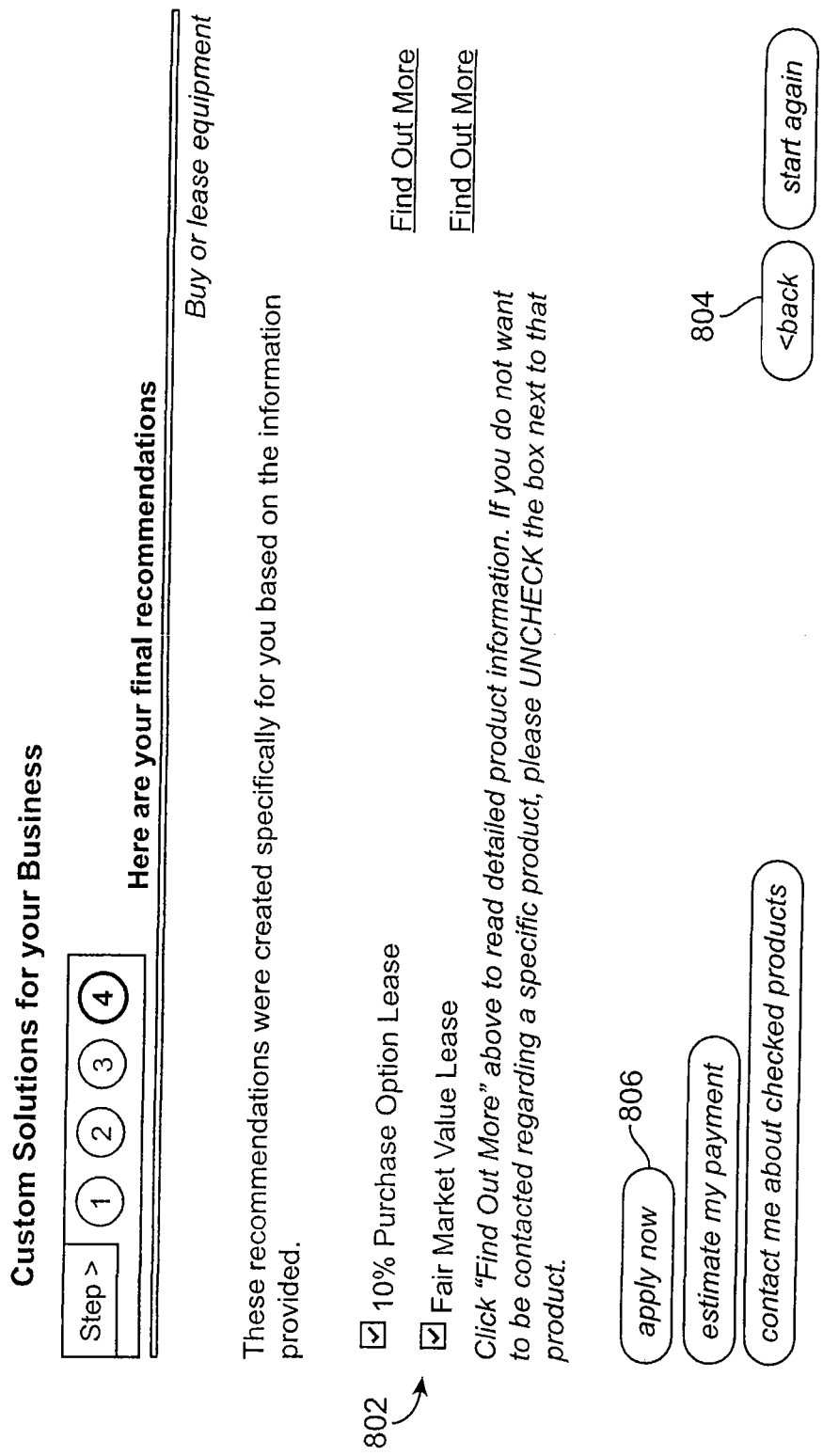
FIG. 8 is one embodiment of a user interface for the fourth web page in a configuration process.

FIG. 8 is one embodiment of a user interface for the fourth web page in a configuration process. Recommendations 802 are provided to the user 102 based on the information provided by the user 102 in previous pages. Again, none of the information previously entered by the user 102 is visible on this web page. It is all stored, however, in the hidden form fields that are part of the source code for the page. If the user 102 were to press the "back" button 804 or the "apply now" button 806, some or all of the information would again be visibly displayed.

Accordingly, the present invention is intended to embrace all such alternatives, modifications and variations as fall within the spirit and scope of the appended claims and equivalents.

What is claimed is:

1. A computer-implemented method for managing session state information, the method comprising:
   receiving, at one or more computer systems configured to generate pages on behalf of an application hosted by an application server, default state information in response to a user session with the application;
   generating, with one or more processors associated with the one or more computer systems, a first page configured to be displayed to a user through a user interface based on the default state information, the default state information being stored in the source code of the first page and hidden in the first page from the user when displayed through the user interface;
   receiving, at the one or more computer systems, a first request from the user in response to one or more interactions of the user with the first page, the first request including updated state information corresponding to the user session;
   determining, with the one or more processors associated with the one or more computer systems, a set of mappings based on the updated state information, each mapping in the set of mapping being between an element of the user interface having state information represented in the updated state information and an object associated with application that stores data for the element and defines one or more procedures the application can take on the data;
   updating, with the one or more processors associated with the one or more computer systems, a control item associated with the application based on each mapping in the set of mapping;
   determining, with the one or more processors associated with the one or more computer systems, whether a second page is to be displayed to the user for the user session;
   if the second page is determined not to be displayed to the user for the user session, and state information for the user session is to be stored for the user session, storing the updated state information to a host database using the one or more computer systems;
   if the second page is to be displayed to the user, generating the second page configured to be displayed to the user through the user interface with the one or more processors associated with the one or more computer systems, the second page having the updated state information encoded therein and hidden from the user when displayed to the user through the user interface,
   wherein state information for the user session is maintained through the second page and any subsequent page issued for the user session, and
   wherein state information is not maintained by the one or more computer systems unless state information is determined to be stored to the host database at a determined point in the user session.

2. A computer-implemented method according to claim 1, wherein:
   the updated state information includes all information obtained from the user during the user session needed to determine a current state of the user session.

3. A computer-implemented method according to claim 1, wherein:
the updated state information includes selections made by the user for configuration of a configurable device.

4. A computer-implemented method according to claim 1, wherein:
the default state information is generated only in response to an action from a user requiring maintaining of state information for the user session.

5. A computer-implemented method according to claim 1, further comprising:
enabling the user to store state information in memory on a client device generating the user interface.

6. A computer-implemented method according to claim 1, further comprising:
determining whether a conflict exists in state information received in a request from the user.

7. A computer-implemented method according to claim 6, further comprising:
sending a notification to the user when a conflict is determined to exist in state information received in a request from the user.

8. A computer-implemented method for managing session state information, the method comprising:
receiving, at one more computer systems configured to generate pages on behalf of an application hosted by an application server, at least one request from a user for a user session, each request including state information for the user session, the state information being contained in a hidden field of the request;
for each request from the user,
determining a set of mappings with the one or more computer systems based on the state information in the request, each mapping in the set of mapping being between an element of a user interface having state information represented in the state information and an object associated with application that stores data for the element and defines one or more procedures the application can take on the data, and
updating a control item associated with the application with the one or more computer system based on each mapping in the set of mapping;
for each page generated for display for the user session in response to the at least one request, storing the state information in at least one hidden field of the page using the one or more computer systems, a first page including default state information; and
wherein the host does not store state information for the user session until a determined point of the user session, the state information instead being maintained during the user session through the hidden fields of the pages and requests for the user session.

9. A computer-implemented method according to claim 8, wherein:
the state information includes all information obtained from the user during the user session needed to determine a current state of the user session.

10. A computer-implemented method according to claim 8, wherein:
the state information includes selections made by the user for configuration of a configurable device.

11. A computer-implemented method according to claim 8, wherein:
state information is generated only in response to an action from a user requiring maintaining of state information for the user session.

12. A computer-implemented method according to claim 8, further comprising:
enabling the user to store the state information in memory on a client device.

13. A system for managing session state information, comprising:
a processor; and
memory including instructions that, when executed by the processor, perform steps comprising:
receiving at least one request from a user to a host for a user session, each request including state information for the user session, the state information being contained in a hidden field of the request;
for each request from the user,
determining a set of mappings based on the state information in the request, each mapping in the set of mapping being between an element of a user interface having state information represented in the state information and an object associated with application that stores data for the element and defines one or more procedures the application can take on the data, and
updating a control item associated with the application based on each mapping in the set of mapping;
for each page generated for display for the user session in response to the at least one request, storing the state information in at least one hidden field of the page, a first page including default state information; and
wherein the host does not store state information for the user session until a determined point of the user session, the state information instead being maintained during the user session through the hidden fields of the pages and requests for the user session.

14. A system according to claim 13, wherein:
the state information includes all information obtained from the user during the user session needed to determine a current state of the user session.

15. A computer-implemented method according to claim 13, wherein:
the state information includes selections made by the user for configuration of a configurable device.

16. A system according to claim 13, wherein:
a first page includes default state information for the user session.

17. A system according to claim 13, wherein:
state information is generated only in response to an action from a user requiring maintaining of state information for the user session.

18. A system according to claim 13, wherein the instructions when executed by the processor further perform a step comprising:
enabling the user to store the state information in memory on a client device.

* * * * *

UNITED STATES PATENT AND TRADEMARK OFFICE
CERTIFICATE OF CORRECTION

| | | |
|---|---|---|
| PATENT NO. | : 7,917,634 B2 | Page 1 of 1 |
| APPLICATION NO. | : 12/241934 | |
| DATED | : March 29, 2011 | |
| INVENTOR(S) | : Silky et al. | |

It is certified that error appears in the above-identified patent and that said Letters Patent is hereby corrected as shown below:

In column 9, line 26, in Claim 8, delete "one more" and insert -- one or more --, therefor.

Signed and Sealed this
Fourth Day of October, 2011

David J. Kappos
*Director of the United States Patent and Trademark Office*